(12) United States Patent
Polonsky et al.

(10) Patent No.: US 8,661,034 B2
(45) Date of Patent: Feb. 25, 2014

(54) BIMODAL RECOMMENDATION ENGINE FOR RECOMMENDING ITEMS AND PEERS

(75) Inventors: Nir Polonsky, Ridgefeld, CT (US); Girish Malangi, Bridgewater, NJ (US); Brian Keif, Maitland, FL (US); Donatus Asumu, Longwood, FL (US); Chris Carroll, Orlando, FL (US); Malini Vittal, San Diego, CA (US)

(73) Assignee: Gartner, Inc., Stamford, CT (US)

( * ) Notice: Subject to any disclaimer, the term of this patent is extended or adjusted under 35 U.S.C. 154(b) by 0 days.

(21) Appl. No.: 13/528,029

(22) Filed: Jun. 20, 2012

(65) Prior Publication Data

US 2013/0159325 A1 Jun. 20, 2013

Related U.S. Application Data

(63) Continuation-in-part of application No. 12/658,192, filed on Feb. 3, 2010, now abandoned.

(51) Int. Cl.
*G06F 17/30* (2006.01)

(52) U.S. Cl.
USPC ........... 707/733; 707/734; 707/687; 707/705; 707/790; 707/899

(58) Field of Classification Search
USPC .................. 707/687, 705, 790, 899, 733, 734
See application file for complete search history.

(56) References Cited

U.S. PATENT DOCUMENTS

| | | | |
|---|---|---|---|
| 5,983,214 A | 11/1999 | Lang et al. | |
| 6,029,161 A * | 2/2000 | Lang et al. | 1/1 |
| 6,078,928 A | 6/2000 | Schnase et al. | |
| 6,112,186 A * | 8/2000 | Bergh et al. | 705/7.32 |
| 6,175,842 B1 | 1/2001 | Kirk et al. | |
| 6,236,978 B1 | 5/2001 | Tuzhilin | |
| 6,236,980 B1 | 5/2001 | Reese | |
| 6,266,649 B1 | 7/2001 | Linden et al. | |
| 6,308,175 B1 | 10/2001 | Lang et al. | |
| 6,314,420 B1 | 11/2001 | Lang et al. | |
| 6,389,372 B1 | 5/2002 | Glance et al. | |
| 7,016,307 B2 | 3/2006 | Vasudev et al. | |
| 7,035,838 B2 | 4/2006 | Nelson et al. | |
| 7,043,443 B1 | 5/2006 | Firestone | |
| 7,047,202 B2 | 5/2006 | Jaipuria et al. | |
| 7,069,308 B2 | 6/2006 | Abrams | |
| 7,167,910 B2 | 1/2007 | Farnham et al. | |
| 7,177,880 B2 | 2/2007 | Ruvolo et al. | |
| 7,188,153 B2 | 3/2007 | Lunt et al. | |
| 7,249,123 B2 | 7/2007 | Elder et al. | |
| 7,269,590 B2 | 9/2007 | Hull et al. | |
| 7,275,102 B2 | 9/2007 | Yeager et al. | |

(Continued)

*Primary Examiner* — Sana Al Hashemi
(74) *Attorney, Agent, or Firm* — Lipsitz & McAllister, LLC

(57) ABSTRACT

A networked peer and item recommendation system makes recommendations to users such as documents of interest and peers with whom the users may want to connect. User profile information is maintained in a profiles database. A log enables the collection of user behavior information. A cluster filtering algorithm determines a cluster that a querying user belongs to. A collaborative filtering algorithm locates other users having implicit and explicit profiles in the database that are similar to the profile of the querying user. A dynamic expert verification algorithm is associated with the collaborative filtering algorithm to verify the qualifications of users and produce bias towards users with higher quality interactions. A search engine returns items based on a keyword provided by the querying user. A sorting algorithm sorts the items returned by the cluster filtering algorithm, collaborative filtering algorithm and search engine for presentation to the querying user.

16 Claims, 8 Drawing Sheets

(56) References Cited

U.S. PATENT DOCUMENTS

| | | |
|---|---|---|
| 7,315,826 B1 | 1/2008 | Guheen et al. |
| 7,359,894 B1 | 4/2008 | Liebman et al. |
| 7,451,161 B2 | 11/2008 | Zhu et al. |
| 7,454,433 B2 | 11/2008 | Ebert |
| 7,499,903 B2 | 3/2009 | Nevin et al. |
| 7,512,628 B2 | 3/2009 | Chess et al. |
| 7,657,907 B2 | 2/2010 | Fennan et al. |
| 7,680,820 B2 | 3/2010 | Denoue et al. |
| 7,917,503 B2 | 3/2011 | Mowatt et al. |
| 2002/0087632 A1 | 7/2002 | Keskar |
| 2002/0194018 A1 | 12/2002 | Scott |
| 2003/0093294 A1 | 5/2003 | Passantino |
| 2004/0015329 A1 | 1/2004 | Shayegan et al. |
| 2004/0073918 A1 | 4/2004 | Ferman et al. |
| 2005/0050227 A1 | 3/2005 | Michelman |
| 2005/0182743 A1 * | 8/2005 | Koenig .......................... 707/1 |
| 2005/0240580 A1 | 10/2005 | Zamir et al. |
| 2006/0085373 A1 | 4/2006 | Dhillion et al. |
| 2006/0179112 A1 | 8/2006 | Weyer et al. |
| 2006/0200434 A1 | 9/2006 | Flinn et al. |
| 2007/0060109 A1 | 3/2007 | Ramer et al. |
| 2008/0005103 A1 * | 1/2008 | Ratcliffe et al. ................ 707/5 |
| 2008/0046555 A1 | 2/2008 | Datta et al. |
| 2008/0104004 A1 | 5/2008 | Brave et al. |
| 2008/0104030 A1 | 5/2008 | Choi et al. |
| 2008/0215623 A1 | 9/2008 | Ramer et al. |
| 2008/0288494 A1 | 11/2008 | Brogger et al. |
| 2008/0294607 A1 | 11/2008 | Partovi et al. |
| 2009/0018851 A1 | 1/2009 | Greenfield |
| 2009/0100047 A1 | 4/2009 | Jones et al. |
| 2010/0105315 A1 | 4/2010 | Albrett |
| 2010/0145937 A1 | 6/2010 | Davis et al. |
| 2011/0113094 A1 | 5/2011 | Chunilal |

\* cited by examiner

BIMODAL RECOMMENDATION ENGINE FOR RECOMMENDING ITEMS AND PEERS

CROSS REFERENCE TO RELATED APPLICATION

This application is a continuation-in-part of commonly owned, co-pending U.S. patent application Ser. No. 12/658,192 filed on Feb. 3, 2010, the entire contents of which are incorporated herein by reference.

BACKGROUND OF THE INVENTION

The present invention relates to a computerized item and peer recommendation system directed toward industry professionals. The system maintains the declared profile of professionals and a history of actions taken by professionals within a given field of expertise, and uses the combination of declared profile and history of actions to recommend items or peers to other professionals within the same or a similar field. The item recommendations can include, for example, documents to be reviewed, events to attend, search keywords that may be of interest, etc.

Various tools for maintaining documentation in various fields are known in the art. For example, U.S. Pat. No. 7,035,838 to Nelson et al. discloses methods and systems for organizing information stored within a computer network-based system. Documentation relating to a plurality of topics and a list of experts on a plurality of topics is stored in a centralized database. A user interface enables a user to search the database for a specific item of information by at least one of a work function, a functional category and a community.

Prior art systems such as those referred to above generally provide a broad spectrum of choices of information, which can be overwhelming. As a result, the most pertinent information may be overlooked or not viewed by the user. If the user is particularly diligent, he or she may try to sort through the many potential articles or other documents that are presented to attempt to find the most relevant ones. Such diligence can waste the user's time and may not result in the best match being found. Often, the user will settle for less relevant information instead of carefully considering each of the many potential matches presented.

It would be advantageous to provide improved apparatus and methods for obtaining relevant information that can assist a user in staying current in a profession and/or can assist in solving a business or technical problem. It would be further advantageous to provide such a system that presents highly relevant information to individual users without overwhelming the user with too much information.

The present invention provides an item and peer recommendation engine which uses a combination of cluster filtering algorithms, collaborative filtering algorithms, search algorithms, and dynamic expert verification algorithms that enjoys the aforementioned and other advantages.

SUMMARY OF THE INVENTION

In accordance with the invention, a system for verifying a user as an expert relative to a querying user using explicit profiles, implicit profiles, peer to peer and peer to expert analyst interactions, as well as other expertise indicators such as the user contribution to forums, virtual events and physical events such as social networks, online webinars, and expert round table discussions, respectively, is provided. In the system, which is implemented on a digital computer network, a computer is coupled to the network, and a profiles database is stored in memory associated with the computer. A user interface is coupled to the computer and enables user profile information to be entered and stored in the profiles database. A log of user behavior enables the capturing of behavioral and item consumption patterns of users. Behavioral and item consumption patterns might include document consumption, events attended, search keywords used, meetings requested, expert interactions conducted, and other items. Also in the aforementioned system, a recommendation engine uses a combination of declared profile information, user consumption patterns, and expert verification techniques to recommend the best items and peers to a querying user (also referred to as a "requester") and to provide expert verification of subject matter experts who have had quality peer to peer interactions and peer to analyst interaction on a given subject matter.

In a preferred embodiment, the system is used to verify a user as an expert relative to a querying user. A log is maintained in which the search behavior and document consumption behavior of all users is captured. In a preferred embodiment, a separate credibility log may be maintained to capture the expertise items. Such items are credibility ratings in peer to peer interactions, credibility ratings from an expert analyst or data fields in expert analyst meeting minutes which comment on expertise, credibility ratings of active contributions in online events, expert round tables, and similar events. A cluster filtering algorithm may be used to determine a cluster that a querying user belongs to. The cluster filtering algorithm:

(i) identifies clusters of users based on document consumption patterns, wherein users reading the same kinds of documents belong to the same clusters,
(ii) locates other users who belong to the same cluster as the querying user,
(iii) locates documents associated with a keyword provided by the querying user and used by the other users in the same cluster, and
(iv) returns the documents located for consideration by the querying user.

A collaborative filtering algorithm locates other users having profiles in the database that are similar to the profile of the querying user. The collaborative filtering algorithm:

(a) locates other users having profiles in the database based on the similarity among the profiles of the querying user and the other users based on at least one of explicit and implicit profiles,
(b) locates other users based on those that are verified experts (for example, have verified expertise in the above-mentioned credibility log or in a similar source) for the keyword provided by the querying user (and prioritizes those with most expertise for the keyword),
(c) determines scores of the other users located in steps (a) and (b) indicative of how well the other users match the querying user,
(d) locates items used by a best matching subset of the other users located in steps (a) and (b) based on the scores, and
(e) returns the items located in step (d) for consideration by the querying user.

A search engine may be provided for returning items based on the keyword provided by the querying user. A sorting algorithm may also be provided for sorting the items returned by the cluster filtering algorithm, collaborative filtering algorithm and search engine. The sorting algorithm gives precedence to items returned by the cluster filtering and collaborative filtering algorithms over items returned by the search engine. Items returned by the cluster filtering and collaborative filtering algorithms that are not also returned by the search engine are not presented to the querying user for consideration.

A dynamic expert verification algorithm is associated with the collaborative filtering algorithm. This dynamic expert verification algorithm is adapted to verify the qualifications of the users as experts relative to the querying user and comprises logic that objectively scores the depth and/or frequency of the user's activity related to a topic area. A separate credibility score described below is used to bias the recommendation of items and peers to other users.

In a preferred embodiment, a log is maintained in which identifications of items used by users are captured and stored on a per user basis, for use in improving future recommendations of items to querying users.

A peer search algorithm can be provided for locating other users having expertise in the keyword provided by the querying user and/or whose user profile contains a match for the keyword provided by the querying user. In such an embodiment, the collaborative filtering algorithm returns peer matches based on step (c), above. A sorting algorithm is used to sort the peers located by the peer search algorithm and returned by the collaborative filtering algorithm. The sorting algorithm gives precedence to peers returned by the collaborative filtering algorithm over peers located by the peer search algorithm.

In one embodiment disclosed, peers who have a higher credibility score from the dynamic expert verification algorithm are ranked higher compared to other peers, using the sorting algorithm. The depth, frequency, recency, and rating of the related items in the credibility log (or a similar source) such as peer to peer interactions, peer to expert analyst interactions, and contributions to peer forums, online events, expert round tables, etc. are used to determine the credibility score.

In one embodiment disclosed, peers returned by the collaborative filtering algorithm that are not also returned by the peer search algorithm are not presented to the querying user for consideration.

An item search engine can be provided for returning items based on the keyword provided by the querying user.

User profile information can be collected on a periodic basis to enable the system to learn about the behavior and profile of users.

Scores can be assigned to the users for particular keywords, providing an indication of the strength of the users with respect to the keywords.

The sorting algorithm can be advantageously designed to give precedence to peers that have connected with the querying user in the past.

It is also possible to assign peers to multiple clusters. In such an embodiment, the assignment of users to multiple clusters can enable item recommendations using fuzzy clustering techniques.

A method is provided for recommending items such as documents, events, search keywords and alert keywords to querying users. The method provides a search log which captures search keywords entered and documents opened. A cluster that a querying user belongs to is determined based on his or her document readership patterns. Other users having profiles in the database who belong to the same cluster as the querying user are located. Items such as documents are located that are associated with a keyword provided by the querying user and have been used by the other users in the same cluster. The items located on the basis of other users in the same cluster are then returned (i.e., presented to) the querying user for consideration. Items other than or in addition to documents can also be returned, depending on the implementation. For example, events attended by other users could be presented to the querying user for consideration and possible attendance in the future.

Other users having profiles in the database that are similar to the profile of the querying user are also located The similarity among the profiles of the querying user and other users can be determined, for example, based on at least one of explicit and implicit profiles. Other relevant users can also be located based on those who have the most expertise for the keyword provided by the querying user. Scores of the other users located can be determined, which scores are indicative of how well the other users match the querying user. Based on these scores, items are located that have been used by a best matching subset of the other users located. The items located on the basis of the best matching subset of the other users are then returned for potential consideration by the querying user.

A search engine can be provided for returning items based on the keyword provided by the querying user. The items returned based on the cluster filtering algorithm, collaborative filtering algorithm, and search engine are then sorted. The sorting routine can give precedence to items returned based on the cluster and collaborative filtering algorithms over items returned by the search engine. In a preferred embodiment, items returned based on the cluster and collaborative filtering algorithms can be withheld from presentation to the querying user if the items are not also returned by the search engine.

A log can be maintained in which identifications of items used by users are captured and stored on a per user basis. This log can be used to improve future recommendations of items to querying users.

Peer matches can be returned to the querying user based on other users whose user profiles indicate they have expertise in the keyword provided by the querying user and/or whose user profile contains a match for an expertise such as a subject expertise or vendor expertise or product expertise provided by the querying user.

Data can be maintained that is indicative of which other users a querying user has previously connected with as a peer. Data can also be maintained that is indicative of which other users were the basis for the recommendation of items a querying user has previously used. Precedence can then be given to items located based on the other users indicated by the maintained data.

In another preferred embodiment, a method for verifying a user as an expert relative to a querying user is also provided. In the method, which is implemented on a digital computer network, a profiles database is stored in memory associated with a computer of the network. A user interface is coupled to the computer and enables user profile information to be entered and stored in the profiles database. Other users in the database having profiles that are similar to the profile of a querying user are then located. Additionally, other users in the database that have the most expertise with regard to a keyword provided by the querying user are also located. The other users located are then scored, the scoring being indicative of how well the other users match the querying user. Based on the scores, items used by a best matching subset of the other users are then located, such items then being returned for consideration by the querying user on the basis of the best matching subset. Qualifications of the users as experts relative to the querying user are then verified using the dynamic expert verification algorithm in which logic is used to objectively score the depth, frequency, recency, and rating of the interactions of the users with their peers and/or expert analysts as well as other expertise items related to a particular topic area.

DETAILED DESCRIPTION OF THE INVENTION

Although the invention is described in connection with a preferred embodiment, it will be appreciated that numerous other embodiments and designs are possible as will be apparent to those skilled in the art.

The invention relates to a Peer & Item Bimodal Recommendation Engine which can recommend both Items and Peers when provided a search keyword and/or a user identifier. Item recommendation includes documents, events, search keywords and alert keywords. The algorithm can be extended to include other kinds of item recommendations in the future.

A system to help users connect with the most appropriate peers (peer recommendation) is disclosed in commonly owned, co-pending U.S. patent application Ser. No. 12/592,799 filed on Dec. 2, 2009, entitled "Interactive Peer Directory" and incorporated herein by reference. The present invention works either independently or in conjunction with the aforementioned Interactive Peer Directory to get the most appropriate peer matches and/or documents for the task(s) that users are working on.

The Peer & Item Bimodal Recommendation Engine of the present invention includes various new and novel features, including the following implementation techniques:

The Engine can recommend both peers and items for a given keyword and/or user identifier.

The Engine combines multiple distinct unique recommendation algorithms to arrive at the recommended peers and items. These algorithms include cluster filtering, collaborative filtering, expert verification algorithms, and search algorithms. The cluster filtering, collaborative filtering, expert verification algorithms, and search algorithms are all implemented uniquely within the inventive system. Using a combination of different algorithms helps to positively reinforce the advantages of each of these algorithms while suppressing their disadvantages.

The Engine looks at both explicit profiles of users and implicit behavioral profiles of users (and peer to peer and peer to expert analyst interactions, as well as other expertise indicators such as the user contribution to forums, virtual events and physical events such as social networks, online webinars, and expert round table discussions) to arrive at item and/or peer recommendations for a given user. Explicit profiles include the user's declared profile such as their demographic information, projects they have worked on, vendors they have worked with, etc. Implicit behavioral profile information includes documents the user has read, search keywords the user has executed, documents the user has saved, etc.

The Peer and Item Recommendation algorithms reinforce each other over time. As recommended items are consumed, the peer suggestions become stronger. Similarly, as recommended peers are connected with, the item recommendations become stronger to the user.

Figure 1:
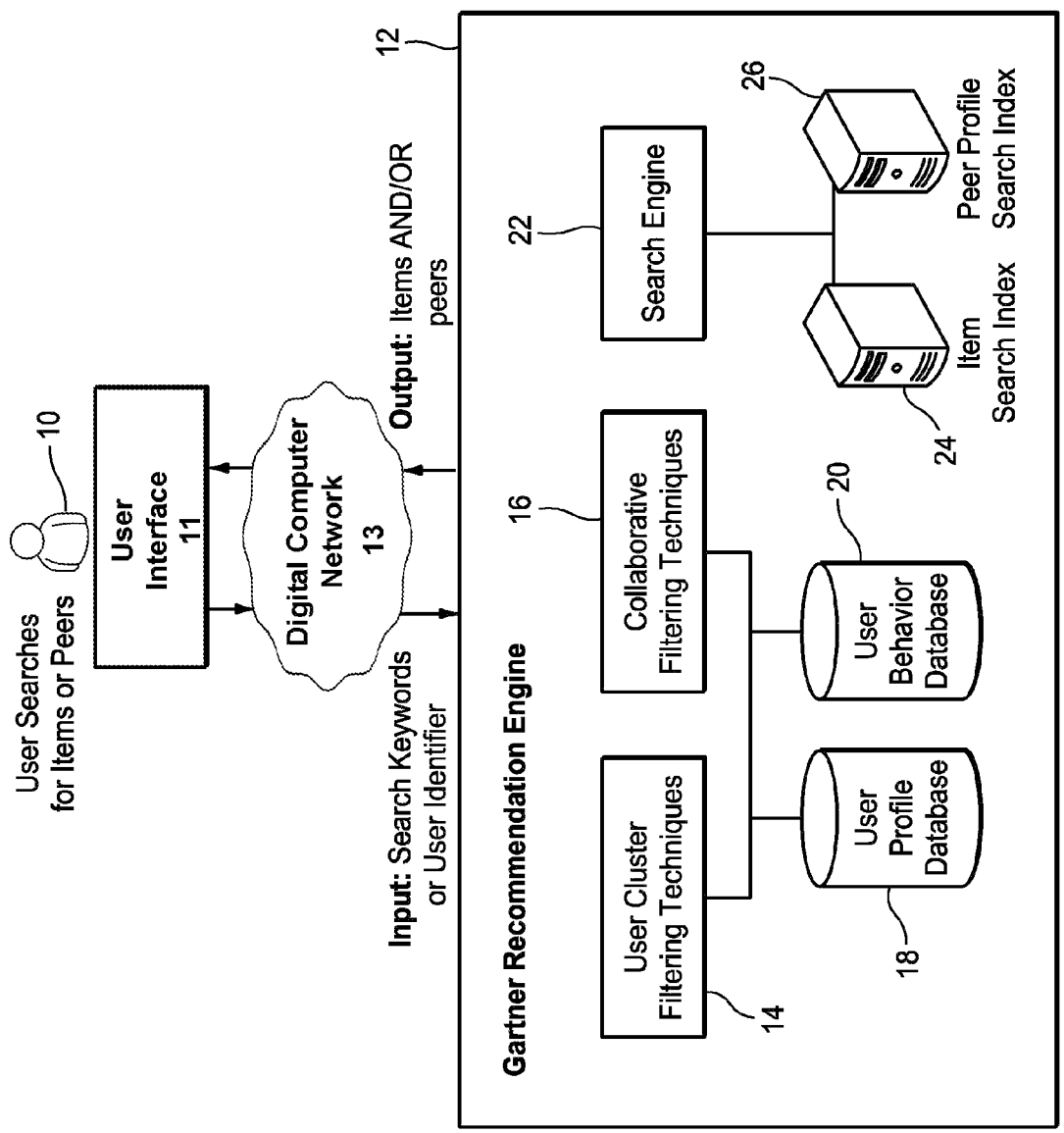
FIG. 1 is a block diagram of an example Peer and Item Bimodal recommendation engine in accordance with the present invention.

FIG. 1 illustrates a "Recommendation Engine" which a user 10 invokes to search for items or peers. Keywords or a user identifier are provided as input via user interface 11 over a digital computer network 13. Items and/or peer matches are provided as output. The items can be, for example, identifications of documents, links to documents and/or copies of the actual documents identified by the recommendation engine. When potential peer matches are provided as output, the peers can be provided, for example, in a list form or as links that the user can click on to obtain more information about the potential peer.

The recommendation engine 12 includes various algorithms. In the illustrated embodiment, user cluster filtering techniques 14 and collaborative filtering techniques 16 are provided, as well as Search algorithms. The algorithms act on information from one or both of a user profile database 18 and a user behavior database 20. A search engine 22 included as part of the recommendation engine 12 searches for items using an item search index 24 and searches for peers using a peer profile search index 26.

Figure 2:
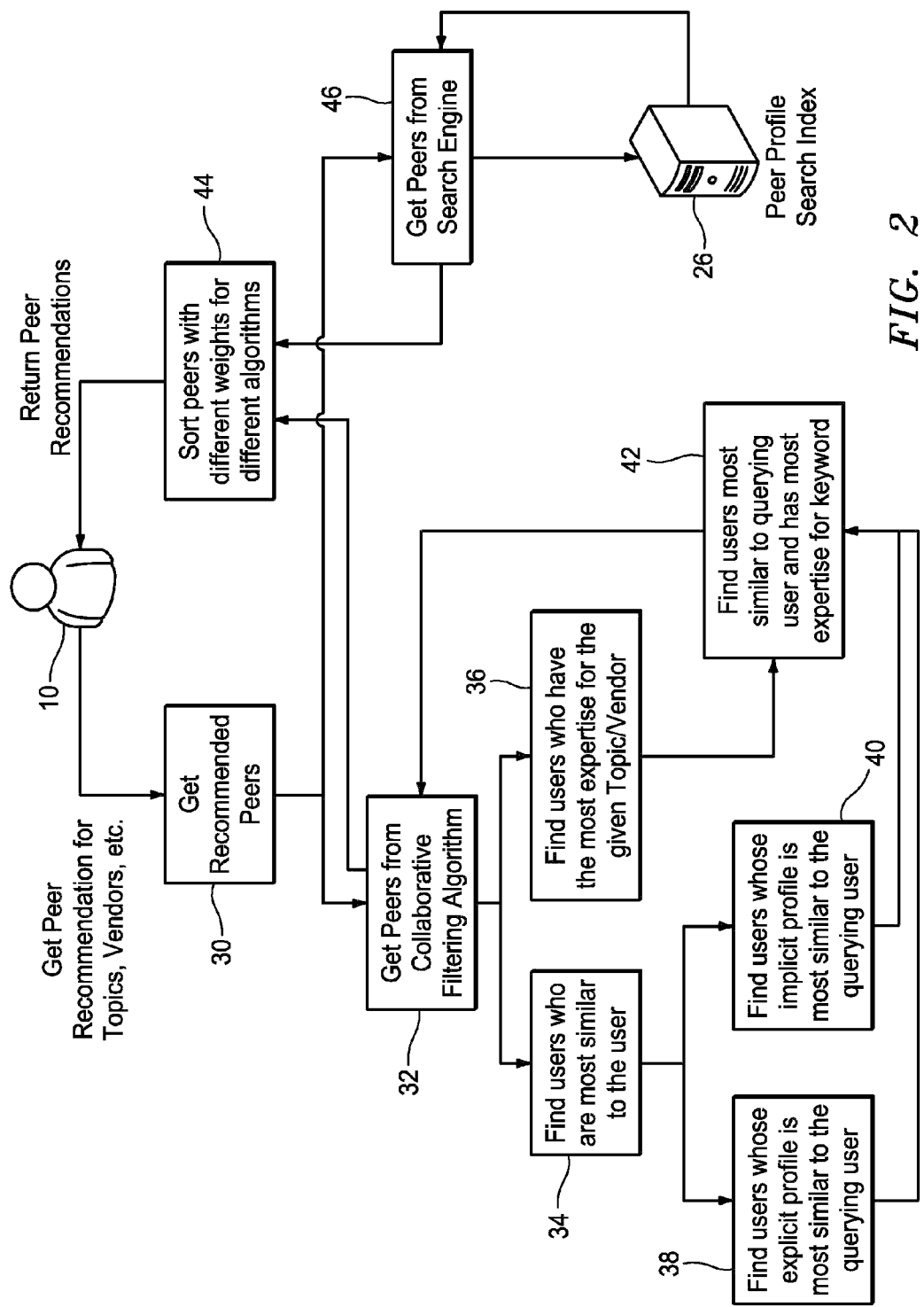
FIG. 2 is a flowchart of an example algorithm for providing peer recommendations in accordance with the invention.

FIG. 2 illustrates a process for providing peer recommendations to the user 10, more specifically referred to as the "requester" or "querying user." A Get Recommended Peers process 30 receives a request from the user and calls two different search algorithms for Peers. These are the Collaborative Filtering Algorithm as indicated at step 32 and a Peer Search Algorithm as indicated at step 46.

The Collaborative Filtering Algorithm finds peers in accordance with the following steps:

(1) At step 34, the algorithm finds users who are most similar to the requester by:
  (a) Finding other users who have the most similar explicit profile to the requester. The explicit profile includes the declared profile of the respective user such as Role, Level, Firm Name, Industry, Firm Size, areas of professional interest, projects declared, etc. This step is indicated at box 38 of FIG. 2.
  (b) Finding other users who have the most similar implicit profile to the requester. Implicit profile includes the documents read by the respective users, documents saved to a library by the respective users, search keywords executed by the respective users, etc. This step is indicated at box 40. The users found are verified experts (for example, have verified expertise in the above-mentioned credibility log or from a similar source) for the keyword provided by the querying user. Those with the most expertise for the keyword are prioritized.

(2) At step 36, users are identified who have expertise in the keywords such as topic keywords or vendor name the querying user ("requester") has input.

(3) At step 42, the best user matches from steps 36, 38 and 40 are received. The system can be implemented to only pass on one best match from each of process steps 36, 38 and 40, or to pass on multiple matches from at least one of these processes. Based on this information, users are located that are most similar to the querying user ("requester") with respect to the explicit and implicit profiles, and which have the best match to the expertise requested by the querying user. The users that are located are identified to step 32, which in turn passes this information on to step 44 described below.

At step 46, the Peer Profile Search Index 26 is used to obtain potential peer matches based on the criteria entered by the requester 10 via step 30. The Peer Profile Search Index contains the declared profile of each system user. This step ensures that the peers returned to step 44 have the topic keywords or vendor names identified by the requester in their declared profile. A search engine is used in this step to query for users.

Step 44 receives information regarding the peers identified by the collaborative filtering algorithm from step 32 and the peers identified by the search engine from step 46. These peers are merged and sorted by giving a higher weight to peers returned from the collaborative filtering algorithm. Peer suggestions which are not in the peer set from step 46 (i.e., peers retrieved from the search engine) are discarded. This ensures that only peers who have the topic keyword or vendor name in their declared profile are recommended.

Figure 3:
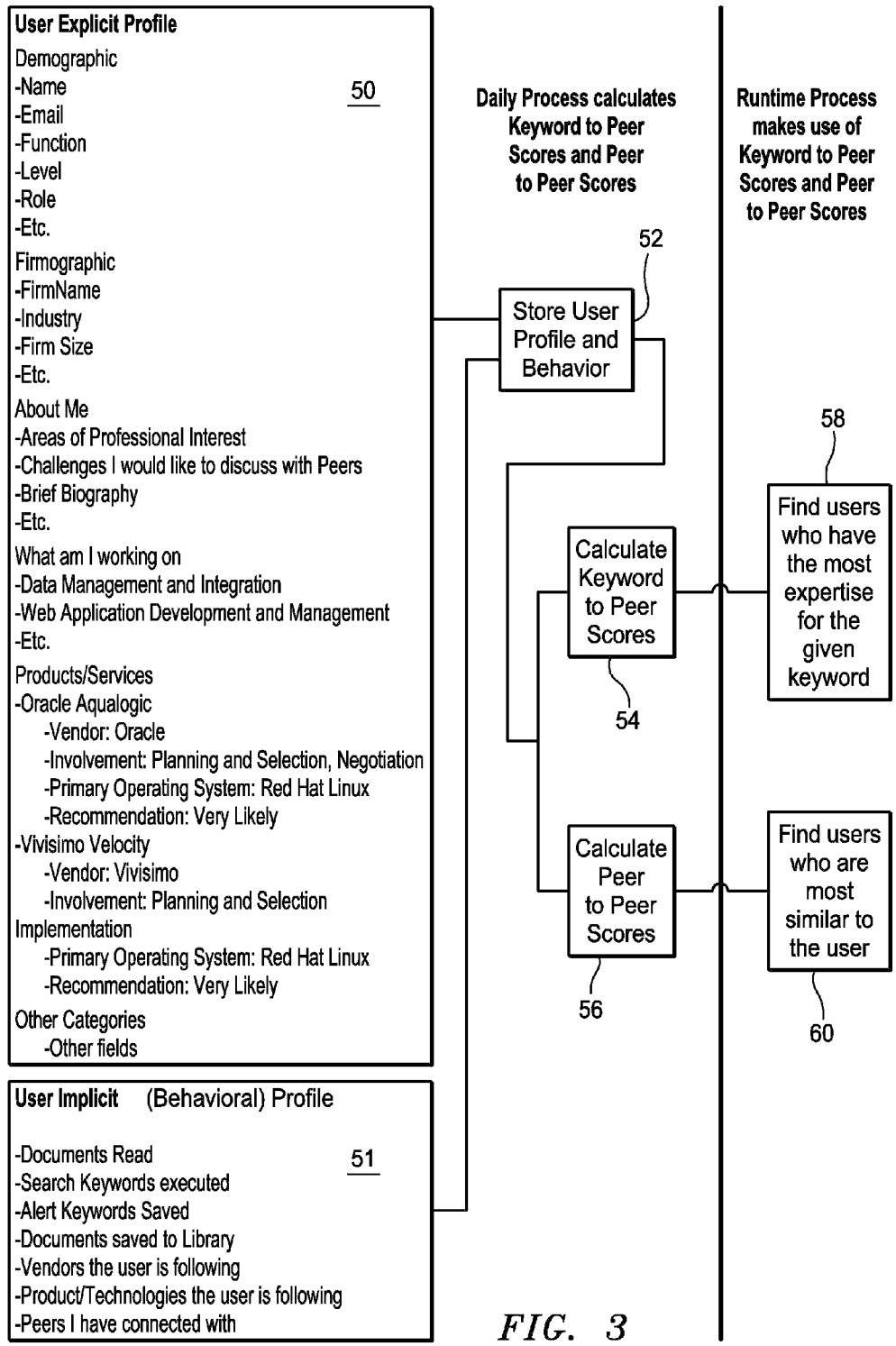
FIG. 3 is a flowchart that details the use of user profile data in an example collaborative filtering algorithm for peer recommendations in accordance with the invention.

FIG. 3 is a block diagram illustrating the collection and updating of explicit and implicit user profile data on a daily basis. This process ensures that the algorithm will continue to learn on a daily basis the behavior and profile of users. Box 50 illustrates the types of information that may typically be provided by users to their individual explicit user profile. This information is stored and maintained in a user profiles database for use by the system. The profile includes, for example, demographic information for the user, including name, email address, job function, job level, role being served at job, and potentially other job related information. Also included in the profile is "firmographic" information relating to the user's employer, such as the firm name, industry, firm size, and the like. Another category of information included in the profile is "about me" information, including, for example, the user's areas of professional interest, challenges that the user would like to discuss with peers, a brief biography of the user, and similar data. A "what am I working on" category can include items such as the user's data management and integration projects, web application development and management responsibilities, and the like.

Another category of information that can be maintained for a user in the profiles database relates to products and services of interest to that user. For example, a user may be responsible for specifying, procuring and/or maintaining a business process management (BPM) suite and/or an enterprise search platform provided by a specific vendor, such as the Oracle Aqualogic suite or the Vivisimo Velocity search platform. This can be identified in the user's profile, together with pertinent information such as the vendor name, the user's involvement with the product, the primary operating system on which the suite is run and the user's recommendation for the product. Other categories of information can also be provided in the user's profile that will be useful in the search for a peer to assist the user in completing an assigned project.

A User Implicit Behavioral Profile is also maintained as indicated at 51 in FIG. 3. This profile includes information such as documents read by a user, keywords used in past searches run by that user, alert keywords saved by the user, documents saved by the user to a library (e.g., a library provided by the system), vendors and/or products and technologies the user is following, and peers that the user is connected with.

The profile and behavior data collected for each user is stored by the system as indicated at step 52. In step 54, keyword to peer scores are calculated. A score is assigned to a peer for a given keyword. This helps the algorithm to understand the strength of the peer for a given keyword. The keyword may be a topic name (virtualization, service oriented architecture, etc.), vendor name (Oracle, IBM, etc.) or any other word occurring in the peer's profile.

In step 56, peer to peer scores are calculated. This helps the algorithm figure out the relative strength or similarity between peers. All implicit and explicit profile data is compared to arrive at these scores. In a preferred embodiment, if a user has connected with particular peers in the past, those peers will be given an additional weight when calculating the peer to peer scores. Steps 52, 54 and 56 are used by the collaborative filtering algorithm to provide item or peer recommendations for a given keyword or a user identifier. These steps can be implemented in a periodic update process (e.g., daily) to calculate the keyword to peer scores and the peer to peer stores. The updated scores are maintained by the system for use in subsequent searches for peers and items that are made by users (requesters).

A runtime process makes use of the keyword to peer scores and the peer to peer scores as illustrated, e.g., in steps 58 and 60 of FIG. 3. In particular, in step 58 the system uses the keyword to peer scores to find users who have the most expertise for a given keyword. In step 60, the system uses the peer to peer scores to find users who are most similar to the requester. These two scores are then combined to provide peer recommendations for a given requester for a given area of expertise.

Figure 4:
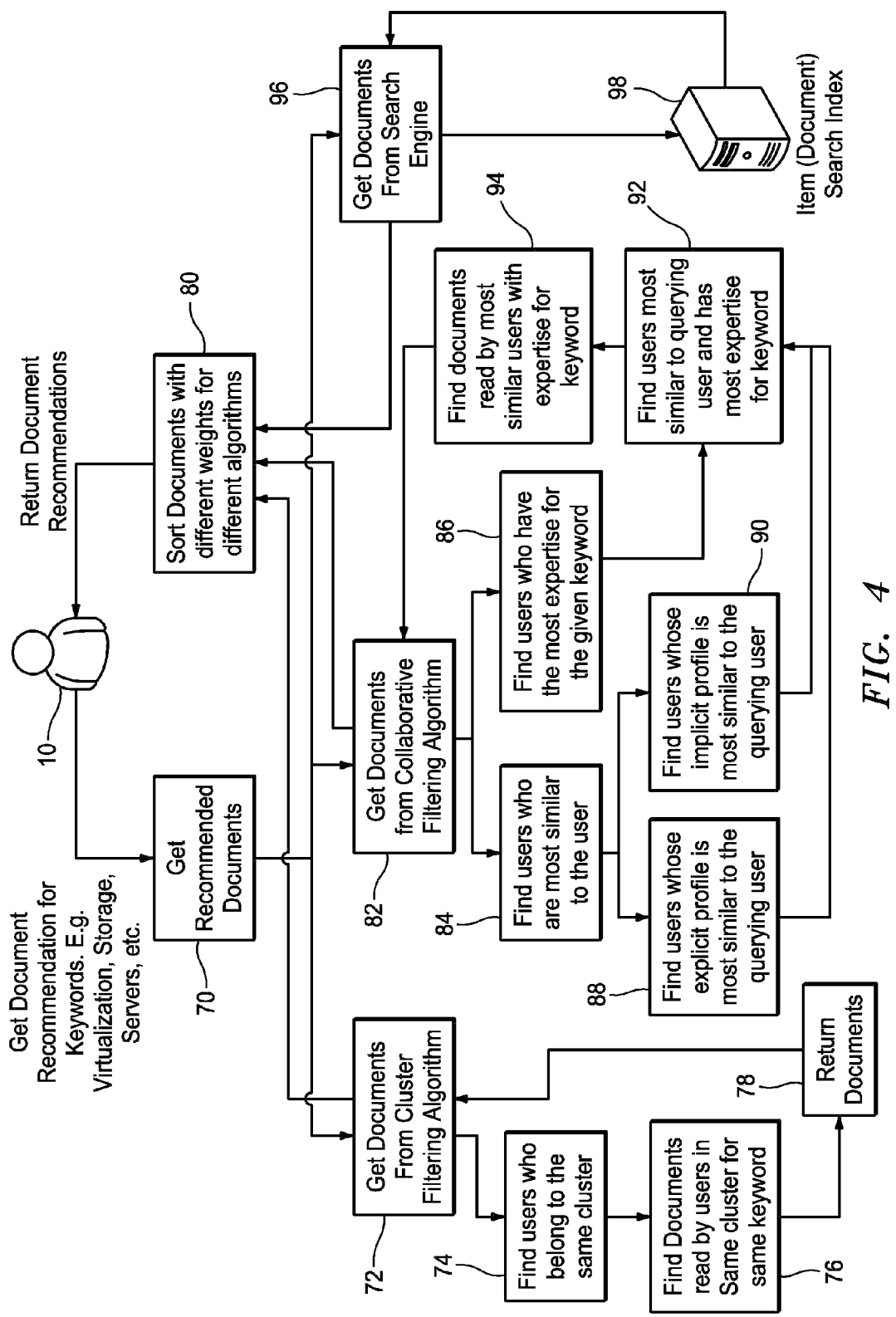
FIG. 4 is a flowchart of an example algorithm for making item (e.g., document) recommendations in accordance with the invention.

FIG. 4 illustrates a routine for providing item recommendations (e.g., document recommendations) to a requester 10. At step 70, a Get Recommended Documents process receives a keyword request from the requester and calls three different algorithms. These are Cluster Filtering Algorithm, Collaborative Filtering Algorithm and the Search Engine. As illustrated in the Figure, step 72 refers to the first step of getting documents from the cluster filtering algorithm. Step 82 refers to the first step of getting documents from the collaborative filtering algorithm. Step 96 refers to the first step of getting documents from the search engine.

The Cluster Filtering Algorithm determines which of a plurality of clusters the requester belongs to and returns the most frequently read (e.g., opened) documents by other users in the same cluster as the querying user. This algorithm brings in an element of personalization to the documents recommended to the requester by the system, since only documents opened by users in the same cluster as the querying user are recommended. The algorithm promotes documents which are determined to be helpful by other users for the same keyword. It executes steps 74, 76 and 78 to return the correct set of documents, as follows:

(1) At step 74, other users who belong to the same cluster as the querying user are found.

(2) At step 76, documents opened by users in the same cluster for the same keyword the requester provided are found.

(3) At step 78, the relevant documents located are returned, for presentation to the requester in any suitable format.

Such formats can include a list of such documents, links to the documents, and/or the documents themselves.

The Collaborative Filtering Algorithm recommends documents by finding other users who are very similar to the querying user and also have expertise in the keywords the user entered. The algorithm then finds the documents read by those users and recommends them. In a preferred embodiment, classic person based collaborative filtering techniques are implemented. The following steps are executed by the collaborative filtering algorithm, which begins at step 82, to recommend documents:

(1) At step 84, users are identified who are most similar to the querying user (requester). This is accomplished on the basis of the users' explicit profiles in step 88 and on the basis of the users' implicit profiles in step 90.
(2) At step 86, users are identified who have the most expertise for the given keyword.
(3) At step 92, the scores of users returned by the preceding steps are used to locate the peers that match the querying user most closely.
(4) At step 94, documents read by the strongest matching peers are identified, and these documents are returned to the requester as recommendations for documents that might be of interest.

In step 96, the Search Engine searches the item (e.g., document) search index 98 to retrieve the appropriate documents based on standard search engine algorithms. This engine analyzes the keywords entered by the requester and ensures that documents returned are relevant to the search term.

In step 80, documents returned by the cluster filtering algorithm, collaborative filtering algorithm, and the search engine are sorted. Higher weights are given to documents returned by the Cluster Filtering and Collaborative Filtering Algorithms. The process also discards documents which are not in the same set as the documents returned by the search engine. This ensures that only relevant documents that contain or pertain to the keyword(s) are recommended to the requester. After the documents are sorted at step 80, they are presented to the requester as recommendations for the requester to read.

Figure 5:
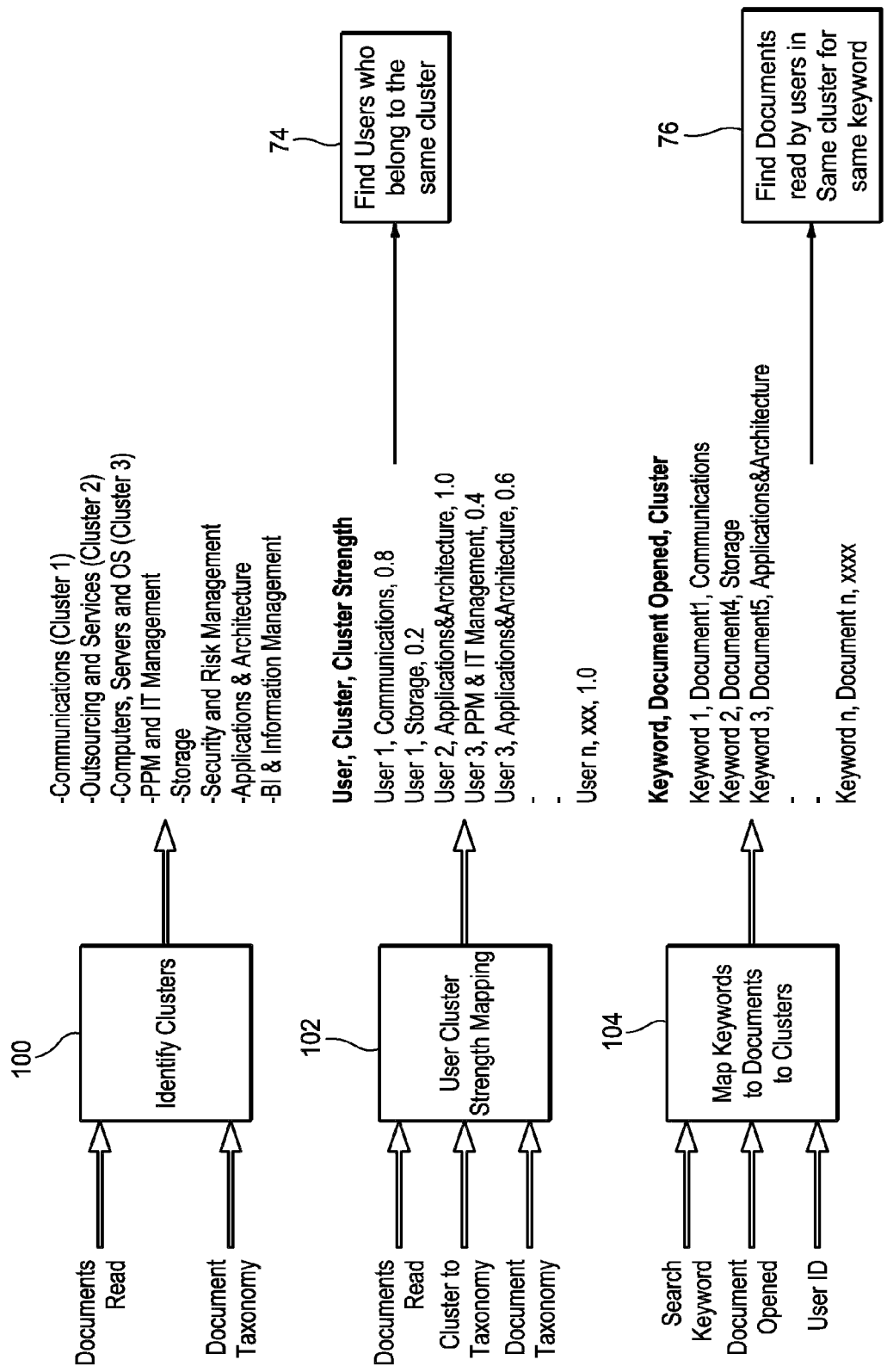
FIG. 5 is a flowchart that details an example cluster filtering algorithm used for item recommendations in accordance with the invention.

FIG. 5 illustrates the cluster filtering detail for item recommendations. Process 100 is responsible for identifying topic clusters by looking at document readership data and document taxonomy data. This is done on a periodic basis so that topic clusters can be adapted based on the changing needs of the user base. Information on documents read by users and document taxonomy (e.g., similarities of document structure or origin, etc.) are provided to the process. Various clusters are identified, such as communications (cluster 1), outsourcing and services (cluster 2), computers, servers and operating systems (cluster 3), PPM and IT management (cluster 4), storage (cluster 5), security and risk management (cluster 6), applications and architecture (cluster 7), and business intelligence and information management (cluster 8).

Once clusters are identified, users are assigned to the topic clusters based on their document readership history. This step is referred to as "User Cluster Strength Mapping" 102. Users can be assigned to multiple clusters to support fuzzy clustering capabilities. This can be done, for example, on a daily basis so that the algorithm is always learning the behavior of the user.

In step 102, as with step 100, inputs include documents read and document taxonomy. In addition, step 102 receives a "Cluster to Taxonomy" input that relates the clusters to document taxonomy. Output from the user cluster strength mapping includes an identification of the user(s), an identification of the relevant cluster(s) the user belongs to and the strength of the user for those cluster(s). In the example shown in FIG. 5, User 1 is identified with a communications cluster at strength 0.8 and a storage cluster at strength 0.2. User 2 is identified with an applications & architecture cluster at strength 1.0. User 3 is identified with a PPM & IT management cluster at strength 0.4 and the applications & architecture cluster at strength 0.6. Additional users can be identified with the same and other clusters at respective strengths.

The user, cluster and cluster strength information is used by process 74, "Find Users Who Belong to the Same Cluster" as described above in connection with FIG. 4. In this step, other users who belong to the same cluster as the querying user are found.

Process 104 of FIG. 5 maps keywords to documents to clusters. Inputs to this step include keyword(s) searched, document(s) opened for that keyword and the requester's user identification. Search logs capture documents opened for search keywords on a per user basis. With data from Process 100 ("Identify Clusters"), process 102 ("User Cluster Strength Mapping") and process 104 ("Map Keywords to Documents to Clusters"), the triplet of cluster->keyword->document opened can be identified. This information is used by the system to recommend documents read by users in the same cluster for same keyword.

Output from step 104 includes keyword(s), document(s) opened and cluster(s). In the example shown in FIG. 5, for Keyword 1, Document 1 is identified in the communications cluster. For Keyword 2, Document 4 is identified in the storage cluster. For Keyword 3, Document 5 is identified in the applications & architecture cluster, etc. This information is used by process 76 of FIG. 4, namely, "Find Documents Read by Users in Same Cluster for Same Keyword."

Figure 6:
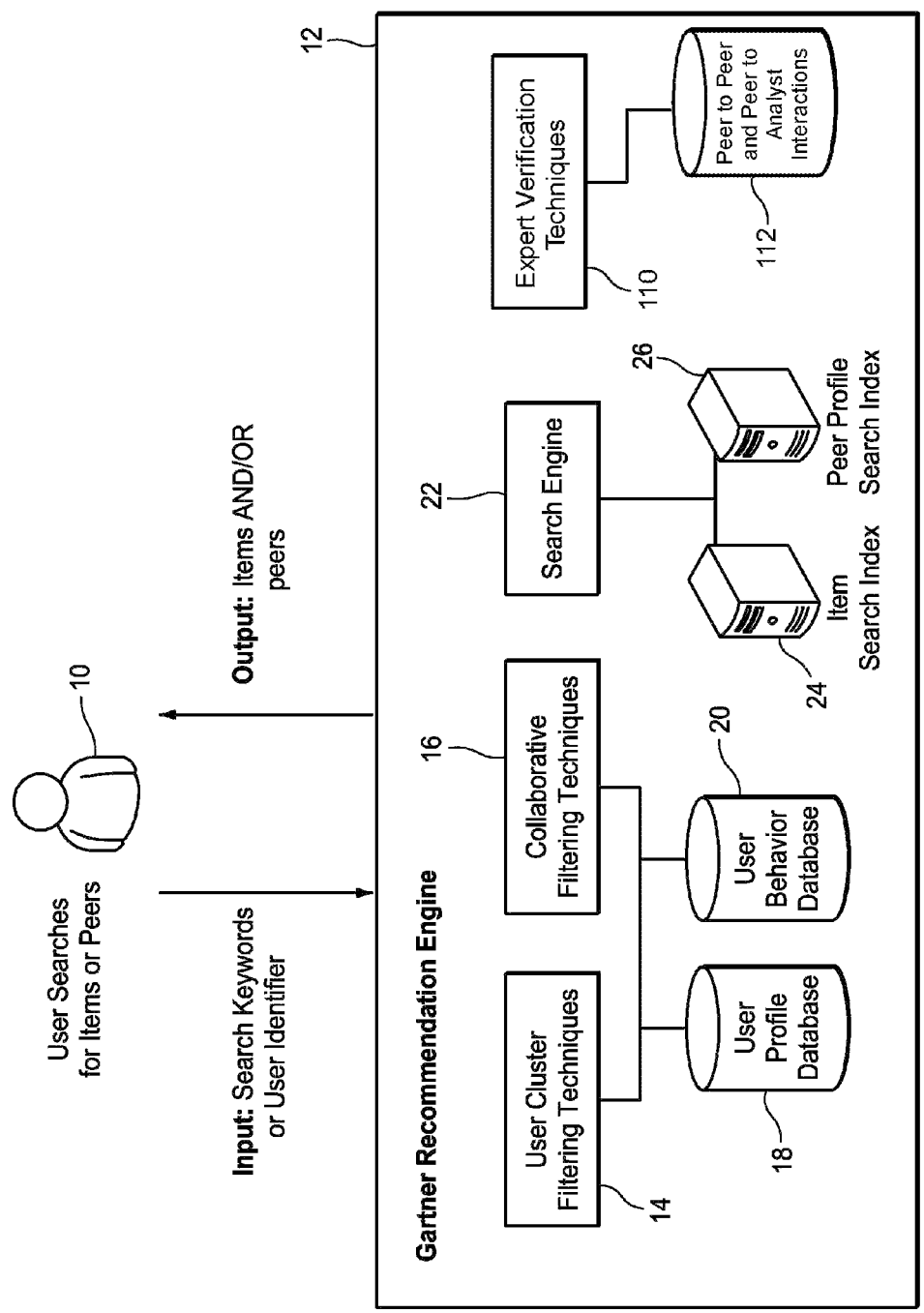
FIG. 6 is a block diagram of the example Peer and Item Bimodal recommendation engine of FIG. 1 in which an expert verification algorithm is incorporated.

FIG. 6 is an embodiment similar to the embodiment of FIG. 1 but includes a dynamic expert verification algorithm 110 incorporated into the recommendation engine 12. In the dynamic expert verification algorithm 110, a log or database in which all peer to peer interactions (which can occur in peer to peer forums) and peer to expert analyst interactions are logged and recorded is shown at 112. Logging and recording all peer to peer interactions and peer to expert analyst interactions in the database 112 allows the expert verification algorithm 110 to dynamically verify the expertise of a peer and to further verify that the users in consideration are truly experts relative to the querying user. A separate credibility log or database may be maintained to record items such as credibility ratings in peer to peer interactions, credibility ratings from an expert analyst or from data fields in expert analyst meeting minutes which comment on expertise, credibility ratings of active contributions in online events, expert round tables, and similar events. The process of verification of the logged or recorded information is based on logic (e.g., hardware and/or software) which objectively scores the depth, frequency, recency, and rating of the interactions of the users with their peers and/or expert analysts as well as other expertise items related to a particular topic area. The logic measures the peer to peer interaction with regard to subject matter of the topic area and is coupled with scoring of the peer's interaction with the analysts (e.g., certified experts).

In objectively scoring the depth and/or frequency of the peer's activity related to a topic area, values are assigned to the peer's activity based on, for example, information derived from the peer's declared profile (e.g., demographic information, projects worked on, vendors worked with, and the like), as well as behavioral information (e.g., documents the peer has read, search keywords executed, documents saved, meetings requested, expert interactions conducted, and the like). Each peer receives a credibility score which provides a ranking (via a sorting algorithm). In doing so, the operation of the algorithm 110 is biased towards peers who not only show expertise based on their implicit and explicit profiles but who also show expertise in the quality of human interactions with other peers and with the analysts. Preference in scoring is given to newer interactions as compared to older interactions. This assures that the subject matter expertise verification is biased towards newer interactions.

Figure 7:
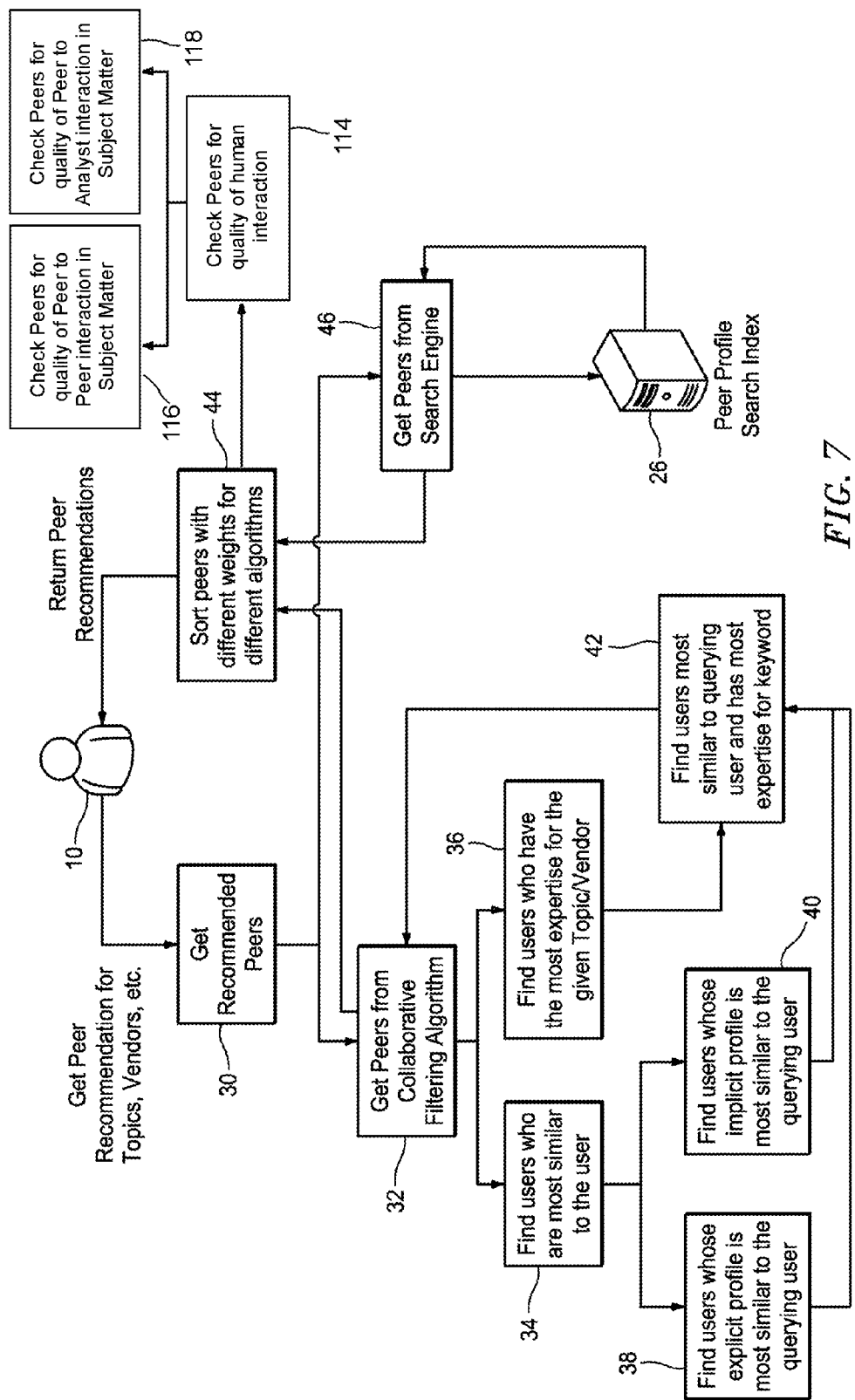
FIG. 7 is a flowchart of the example algorithm of FIG. 2, in which peers are checked using a sorting algorithm.

FIG. 7 is an embodiment similar to the embodiment of FIG. 2 in which in addition to recording the interactions themselves, the subject matter of the interactions and the quality of the interactions are also recorded. From the information regarding the peers identified by the collaborative filtering algorithm from step 32 and the peers identified by the search engine from step 46 received into step 44, the peers are reviewed for their quality of human interaction in a step 114. As a result of this review, the quality of peer to peer interaction in the subject matter can be assessed, as indicated in a step 116. Additionally, the quality of peer to analyst interaction in the subject matter can be assessed, as indicated in a step 118. The peer to expert analyst interactions can occur in scheduled interactions with the analyst. Peers suggested are positively biased towards users who have higher quality peer to peer and peer to expert analyst interactions.

Figure 8:
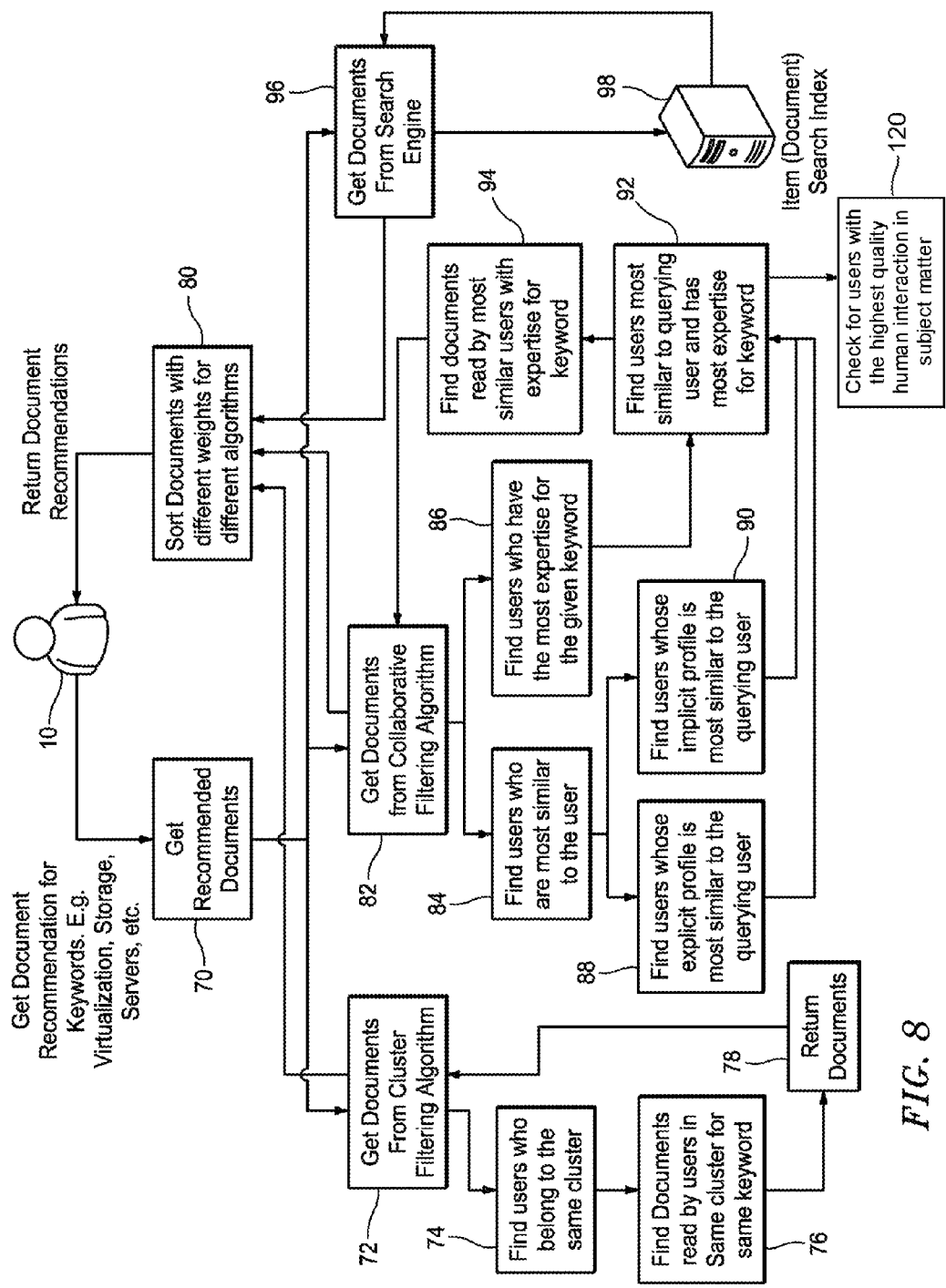
FIG. 8 is a flowchart of the example algorithm of FIG. 4, in which users with the highest quality human interaction in subject matter are checked.

FIG. 8 is an embodiment similar to the embodiment of FIG. 4 but illustrating a step 120 in which peers with the highest quality human interaction in a particular subject matter are assessed and qualified. In assessing and qualifying peers with the highest quality human interaction in the particular subject matter, values related to various aspects of interaction are used to rate the quality of the interaction. A filtering algorithm is then employed to provide positive bias towards the peers with higher quality interactions.

In a particularly advantageous embodiment of the invention, item and peer recommendations reinforce each other over time. This is accomplished as follows:

(1) When a user consumes recommended items (e.g., opens a recommended document), that user will be placed closer to the peers on whom the item recommendations are based. In order to achieve this, the algorithm is designed to take into account the item consumption pattern of other users when it calculates the peer-to-peer scores. As a result, item consumption by users results in providing better peer recommendations in the future.

(2) When a user connects with a peer, the items that will be recommended to that user in the future will be similar to the items consumed by the peers he has connected with. This is achieved by designing the algorithm to keep track of connected peers and give a higher weight to connected users when calculating the peer to peer scores. The algorithm assumes that if a user has connected with a peer before, then the user is closer to the connected peer compared to other similar peers the user has not connected with. Keeping track of peer connections therefore results in providing better item recommendations in the future.

It should now be appreciated that the present invention provides apparatus and methods for facilitating the connection of peers as well as the recommendation of items, such as documents, that may be of interest to users. Items and peers are recommended in response to a search keyword and/or a user identifier. A system in accordance with the invention allows users to connect with the most appropriate peers and to get the most appropriate documents and other resources for a task that the user is working on. Cluster filtering, collaborative filtering, dynamic expert verifications algorithms, and search algorithms are used to implement the system. As recommended items are consumed (e.g., as documents are opened, events are attended, etc.), the future peer suggestions become stronger. Similarly, as recommended peers are connected with, the item recommendations become stronger.

Unlike previously known systems, the system of the present invention can recommend both items and peers. A combination of cluster filtering/collaborative filtering, dynamic expert verification algorithms, and search algorithms provide concise, highly relevant results. Advantageously, both implicit and explicit profiles of users are relied on in making recommendations. Peer to peer and peer to expert analyst interactions, as well as other expertise indicators such as the user contribution to forums, virtual events and physical events such as social networks, online webinars, and expert round table discussions may also be relied on. Moreover, the inventive system and methods allow peer and item recommendations to reinforce each other over time, further increasing the relevancy of the results.

Although the invention has been described in accordance with preferred embodiments, various other embodiments can be provided and are intended to be included within the scope of the claims.

What is claimed is:

1. A system for recommending items to a user and verifying a user as an expert relative to a querying user, the system being implemented on a digital computer network, the system comprising:
   a computer coupled to the network;
   a profiles database stored in memory associated with the computer for storing explicit and implicit user profiles;
   a user interface coupled to the computer network and enabling user profile information to be entered and stored in the profiles database as an explicit user profile;
   the explicit user profiles comprising user entered information which comprises at least one of demographic information and occupation information;
   the implicit user profiles are obtained from user behavior information comprising at least one of keyword searches executed by the user, documents viewed by the user, documents saved by the user, vendors, products, or technologies the user is following, and peers the user has connected with;
   a collaborative filtering algorithm associated with the profiles database, said collaborative filtering algorithm:
      (a) locating other users having profiles in the database based on a similarity among the profiles of a querying user and the other users based on at least one of the explicit profiles and the implicit profiles,
      (b) locating other users based on their expertise to define verified experts for the keyword provided by the querying user and prioritizing the verified experts with most expertise for the keyword,
      (c) determining scores of the other users located in steps (a) and (b) indicative of how well the other users match the querying user,
      (d) locating items used by a best matching subset of the other users located in steps (a) and (b) based on the scores, and
      (e) returning the items located in step (d) for consideration by the querying user; and
   a dynamic expert verification algorithm associated with the collaborative filtering algorithm, the expert verification algorithm being adapted to verify qualifications of the other users as experts relative to the querying user, the expert verification algorithm comprising logic used to objectively score at least one of a depth and a frequency of the user's activity related to a topic area;

wherein:
the user behavior information is collected and stored in the profiles database; and
the collected and stored user behavior information is used to update the implicit user profiles.

2. The system in accordance with claim 1, wherein the logic objectively scores both the depth and frequency of the user's activity.

3. The system in accordance with claim 2, wherein the dynamic expert verification algorithm comprises a database in which peer to peer and peer to expert analyst interactions are recorded.

4. The system in accordance with claim 3, wherein the logic used to objectively score the depth and the frequency of a peer is based on the quality of the peer's interactions with other peers and expert analysts.

5. The system in accordance with claim 4, wherein a measurement of the interaction between the users is scored based on a scheduled interaction of the querying user with expert analysts.

6. A method for recommending items to a user and verifying a user as an expert relative to a querying user, the method being implemented on a digital computer network, the method comprising:
providing a computer coupled to the network;
providing a profiles database stored in memory associated with the computer for storing explicit and implicit user profiles;
providing a user interface coupled to the computer network and enabling user profile information to be entered and stored in a profiles database as an explicit user profile;
the explicit user profiles comprising user entered information which comprises at least one of demographic information and occupation information;
the implicit user profiles are obtained from user behavior information comprising at least one of keyword searches executed by the user, documents viewed by the user, documents saved by the user, vendors, products, or technologies the user is following, and peers the user has connected with;
locating other users in said database that are similar to the profile of a querying user based on at least one of the explicit profiles and the implicit profiles;
locating other users in said database that have the most expertise for a keyword provided by the querying user;
determining scores of the other users located indicative of how well said other users match said querying user;
based on said scores, locating items used by a best matching subset of the other users located;
returning the items located on the basis of the best matching subset for consideration by the querying user; and
verifying the qualifications of the users as experts, utilizing logic to objectively score at least one of a depth and a frequency of human interactions with peers and expert analysts related to a topic area;
wherein:
the user behavior information is collected and stored in the profiles database; and
the collected and stored user behavior information is used to update the implicit user profiles.

7. The method in accordance with claim 6, wherein the logic is utilized to objectively score both the depth and frequency of said human interactions.

8. The method in accordance with claim 7, wherein the step of verifying the qualifications of the other users comprises logging peer to peer interactions and peer to expert analysts interactions into a database.

9. The method in accordance with claim 8, wherein the step of verifying the qualifications by utilizing logic to objectively score the depth and the frequency of the user's activity related to the topic area is based on values assigned to the user's interactions with other peers and expert analysts.

10. The method in accordance with claim 9, wherein the step of verifying the qualifications by utilizing logic to objectively score the depth and the frequency of the user's activity produces a positive bias towards users with higher quality interactions with their peers and expert analysts in a given subject matter.

11. The method in accordance with claim 10, wherein a preference in the scoring is given to newer interactions as compared to older interactions.

12. The method in accordance with claim 8, wherein the step of logging interactions between the peers and expert analysts and the querying user into a database comprises logging subject matter of interactions between the peers and expert analysts and the querying user into a database.

13. The method in accordance with claim 12, further comprising reviewing at least one of the peers and expert analysts and the querying user for a quality of human interaction.

14. The method in accordance with claim 13, further comprising assessing and qualifying at least one of the peers and expert analysts and the querying user with regard to the quality of human interaction.

15. The method in accordance with claim 14, further comprising rating the quality of the human interaction.

16. The method in accordance with claim 15, further comprising filtering the rated human interactions to retain users with values exceeding a predetermined level.

* * * * *